United States Patent [19]

Gruhler

[11] Patent Number: 4,924,598
[45] Date of Patent: May 15, 1990

[54] HEIGHT MEASURING INSTRUMENT

[75] Inventor: Siegfried Gruhler, Oberndorf, Fed. Rep. of Germany

[73] Assignee: Mauser-Werke Oberndorf GmbH, Oberndorf, Fed. Rep. of Germany

[21] Appl. No.: 204,389

[22] Filed: Jun. 9, 1988

[30] Foreign Application Priority Data

Jun. 11, 1987 [DE] Fed. Rep. of Germany ....... 3719509

[51] Int. Cl.$^5$ ............................ G01B 5/02; G01B 7/00
[52] U.S. Cl. ........................................ 33/832; 33/503
[58] Field of Search ............... 33/832, 838, 503, 1 M, 33/702

[56] References Cited

U.S. PATENT DOCUMENTS

| 2,926,426 | 3/1960 | Lury | 33/832 |
| 4,432,141 | 2/1984 | Marcyan | 33/838 |
| 4,459,755 | 7/1984 | Gruhler | 33/832 |
| 4,498,241 | 2/1985 | Nakaoki | 33/832 |
| 4,766,674 | 8/1988 | Zanier et al. | 33/503 |

FOREIGN PATENT DOCUMENTS

| 2948712 | 6/1981 | Fed. Rep. of Germany . | |
| 129705 | 10/1980 | Japan | 33/832 |
| 47202 | 3/1983 | Japan | 33/832 |
| 2086568 | 5/1982 | United Kingdom | 33/832 |
| 2098331 | 11/1982 | United Kingdom | 33/832 |

Primary Examiner—William A. Cuchlinski, Jr.
Assistant Examiner—Patrick R. Scanlon
Attorney, Agent, or Firm—McGlew & Tuttle

[57] ABSTRACT

A height measuring device comprises a carriage containing a measuring pin which is moved by a drive motor against an article to be measured in a manner such that the measuring takes place when the pin is held against the article with a precise measuring force. The construction includes a carriage which is supported by an endless belt and moved upwardly and downwardly by driving one of the rollers over which the belt is guided. A ram rod extends through a hollow area of the carriage which is divided by a ring piece into upper and lower chambers, the coil springs are placed around the ram rods in both the upper and lower chambers and are braced between the ring pieces at their one ends and the portion of the carriage which closes each end of the hollow portion of the carriage. The drive motor for moving the carriage is controlled by a control which ensures that the movement for urging the measurement in against the article will always take place at a selected measurement pressure between the pin and the article to be measured.

12 Claims, 5 Drawing Sheets

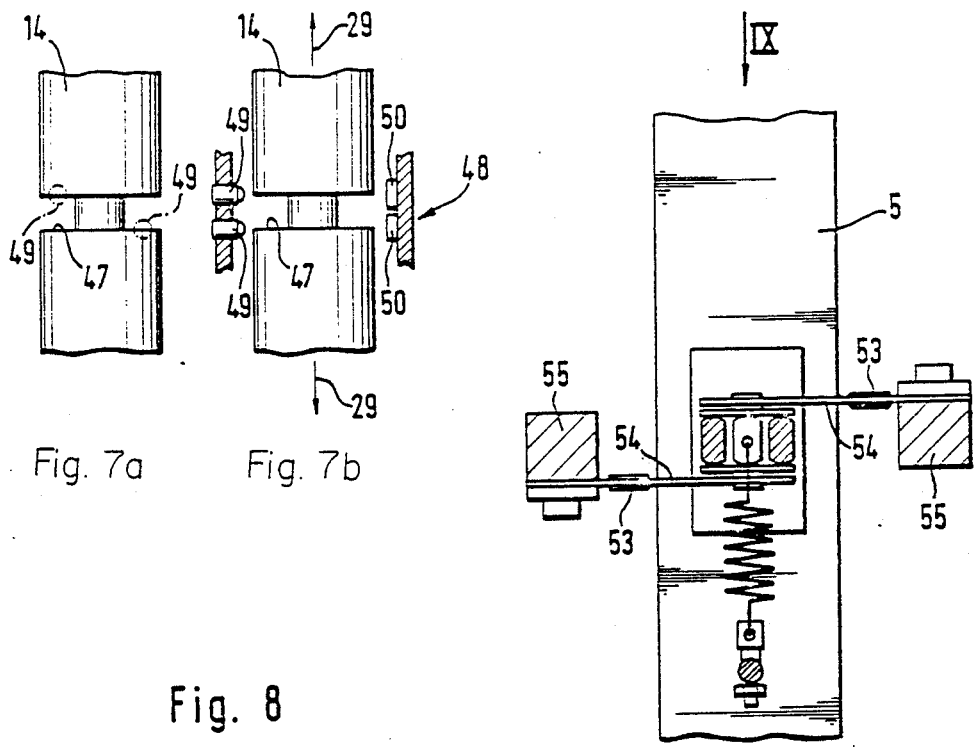
Fig. 9
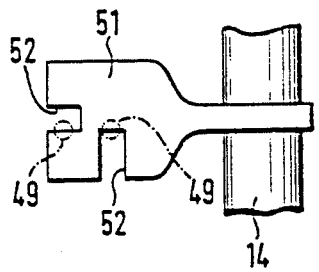
Fig. 7a   Fig. 7b
Fig. 8
Fig. 10

HEIGHT MEASURING INSTRUMENT

FIELD AND BACKGROUND OF THE INVENTION

The invention relates in general to measurement devices and in particular to a new and useful height measuring instrument.

A similar height measuring device is known from German patent No. 31 09 856, in which the measuring force can be adjusted independently of the position of the measurement site and the position of the carriage relative to this and is constant over the entire measurement range. In order to achieve these basic requirements of the known height measuring device, the output of the drive motor is connected to a magnetic field coupling, which has an extremely constant moment of slip. Once the measuring pin presses against a measurement site with sufficient measurement force, the magnetic field coupling slides through, while the motor continues to run and the coupling secures the measuring pin at the measurement site. Hence, the measuring force is of course independent of the height of the measurement site. The particular measured quantity is to be read off between the carriage and the stanchion.

SUMMARY OF THE INVENTION

The invention provides a height measuring device in which the measuring force can also be adjusted independently of the position of the measurement site and of the position of the carriage relative to this, and it is constant over the entire measurement range. The invention is achieved by simple means and without connecting a coupling to the output of the drive motor.

According to the invention, a height measuring device includes, between a measurement carriage and its fastening to a steel belt, a measuring force generator unit, which in concert with a control unit of the drive motor produces a selectable, constantly regulated sensing force between the measuring pin and a measuring pin and a measuring site.

In this way, the fastening of the carriage, bearing the measuring pin, to the drive belt is utilized and a so-called measuring force generator unit is employed between the carriage and the fastening to the drive belt. This measuring force generator unit interacts with the control unit of the drive motor. By installing the measuring force generator unit directly on the carriage, there is no need for the magnetic field coupling at the output of the motor, as in the state of the art. The requisite constant measuring force of the measuring pin, when probing a measurement site, is achieved solely by the measuring force generator unit and the coupled drive motor. The measuring force generator unit operates in either direction of movement of the carriage.

In the implementation of the invention, the measuring force generator unit is advantageously formed from a ram secured to the carriage, and which has both ends firmly connected to the drive belt. The unit is divided into an upper and a lower segment, each of which is biased by springs which operate independently of each other and are axially braced at either end. The ram may be arranged in a housing on or in the carriage, which can be tightly closed by an upper and a lower base. A separating element is arranged about the ram as a ring approximately at the middle of the lengthwise axis of the ram. The separating element divides the housing into an upper and a lower chamber, in each of which one spring is installed. The ends of the springs are braced against the separating element and against a ring seated on the base. The separating element can be retained in the housing by a screw connection in such way that it allows a limited, axially displaced adjustability. Furthermore, the ram may have an adjusting nut at either end outside the bases of the housing, for a fixed stop.

Accordingly, a resilient element is placed between the carriage and the suspension of the belt. If, now, the drive belt is pulled upwards by the motor force, only the lower spring in the lower chamber of the housing is effective during the probing of the measuring pin in this case. The upper spring remains entirely at rest. The converse applies, of course, if the belt is moved downward by the motor force and the ram therefore also travels downward. This simple and advantageous mode of operation is made possible by the separating element arranged roughly in the middle. Furthermore, the weight of the carriage can be counterbalanced by the clamping screw, which can be tightened in a small axial range. This invented measuring force generator unit allows a probing of the measuring pin with the carriage traveling in either of the opposing directions. The springs make possible a prestressing, corresponding to the measuring force. During the probing, a constant and reproducible measuring force can be applied each time from a prestressed position of rest.

In another configuration of the invention, the control unit of the drive motor can be formed from a measuring force regulator and a position regulator for the measuring pin, which act on the motor in dependence on the preset measuring force of the measuring pin against a measurement site and the position of the measuring pin. It is advantageous to have the measuring force regulator connected to a sensor that picks up the motion of the ram. There can be two optical sensors which detect the axial movement of the ram at an annular groove of the ram.

Alternatively, there can be two optical sensors in a differential arrangement, which detect the axial movement of the ram at a vane, fastened to the ram. In still another alternative, a strain gage sensor (wire strain gage) may be provided, which detects the axial movement of the ram by an alteration in the strain gages, arranged on plate springs, which are firmly contained at one end, while their other end is firmly connected to the ram. In yet another embodiment, a shaft encoder can be provided, which detects the axial motion of the ram indirectly in comparison with the incremental measurement system.

The carriage, along with the housing of the measuring force generator unit, is advantageously formed from a carbon fiber material.

The mounting of the carriage with the measuring force generator unit on the stanchion, finally, is advantageously done by rollers, firmly mounted and/or spring loaded in the wall of the carriage, as desired. All of these features result in a robust and shop-ready guidance mechanism, protecting the entire measurement carriage against collision. The particular choice of material enables a relatively lightweight overall design.

The sensors employed make it possible to detect the deflections and the prestressing of the springs in the measuring force generator unit. This means that the sensors will have ascertained the particular position of the measurement carriage or measuring pin and reported this actual position to the drive motor. This notification is done by a signal or a command, via the control unit. As the measuring pin reaches a pre-selected position, the motor halts with a pre-selected prestress. The nominal value of the measuring force for the probing is entered by a measuring force regulator in the control unit. The difference between the nominal and the actual value is corrected by a speed regulator, the value resulting from the nominal/actual comparison being further corrected by the speed regulator. Thus, the sensors observe the movement of the spring and the ram and, hence, the particular prestressing force, corresponding to a certain measuring force, to the control unit, through which the drive motor is regulated.

In the control unit, the so-called positioning drive and the regulation are adjusted to a constant measuring force. Depending on the pre-selected speed, a so-called dragging distance of the carriage with the particular measuring pin is produced. In the case of manual positioning, the speed value is directly generated by a joystick. Regulation onto the deflection of the measuring force generator unit corresponds indirectly to the pre-selected probing pressure.

When the prestressing force is exceeded, the unit is switched to a probing mode.

Accordingly it is an object of the invention to provide an improved height measuring device which includes a measuring pin carried on a carriage which is movable with a driving belt which is connected to the carriage through a ramrod which extends through a hollow space of the carriage which is divided by a ring piece which includes coil springs around the ramrod which brace against the ring piece and the respective ends of the hollow space of the carriage and which includes a control for driving the belt which is connected to the ramrod so as to ensure that the measuring pin in moved in either upward or downward direction against the article to be measured with a predetermined force.

A further object of the invention is to provide a measuring device which is simple in design, rugged in construction and economical to manufacture.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

BRIEF DESCRIPTION OF THE DRAWINGS

In the drawings:

FIGS. 7a and 7b are partial elevational view of embodiments for the arrangement of the sensors for regulation of the probing pressure;

FIG. 8 is a view similar to FIG. 7 of another embodiment for the arrangement of the sensors for regulation of the probing pressure;

FIG. 9 is a view similar to FIG. 7 of another embodiment for a third possibility of the use of sensors for motor regulation;

FIG. 10 is an end elevational view of the sensors shown in FIG. 8.

DESCRIPTION OF THE PREFERRED EMBODIMENTS

Figure 1:
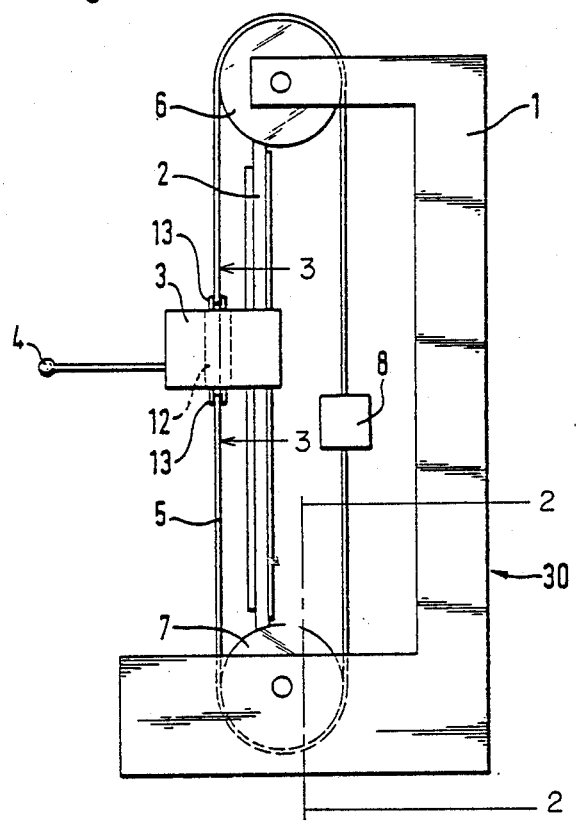
FIG. 1 is a schematic side elevational view of a height measuring device constructed in accordance with the invention.
Figure 2:
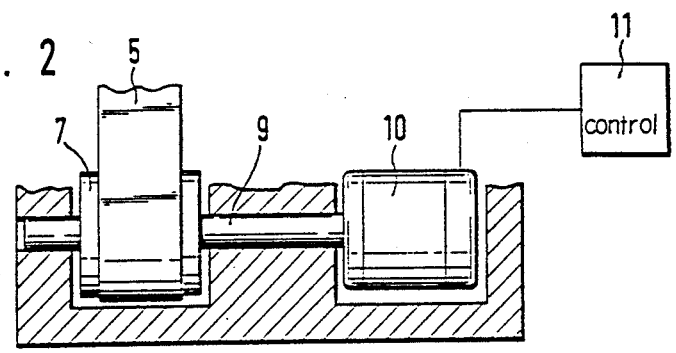
FIG. 2 is a section taken along the line 2—2 of FIG. 1 showing a drive of the height measuring device of FIG. 1.

Referring to the drawings in particular the invention embodied therein comprises a height measuring device which includes a support or stanchion which supports an endless belt system including upper and lower guide rollers 6 and 7 over which an endless belt 5 having a carriage 3 connected thereto is movable.

The height measuring device has a support or stanchion 1 with a guide or guiding mechanism 2. Mounted on the guiding mechanism 2 is a measurement carriage 3, on which a measuring pin 4 is rigidly fixed. A measurement reading is done, as a rule, between the measurement carriage 3 and the stanchion or the guide 2.

In the example shown in FIG. 1, the carriage 3 is suspended on an endless steel belt 5, which is led about an upper deflection pulley 6 and a lower deflection pulley 7 of the stanchion 1. On the side opposite the carriage 3, a counterweight 8 is secured to the steel belt 5, the weight of which is equal to that of the carriage 3 together with the measuring pin 4. The lower deflection pulley 7 is driven by an electric gear motor 10 across a shaft 9. The control unit for the drive motor 10 is indicated by 11.

On the measurement carriage 3 is located the measuring force generator unit 12, which is firmly connected to both the measurement carriage 3 and to the steel belt 5 across mounting links 13.

Figure 3:
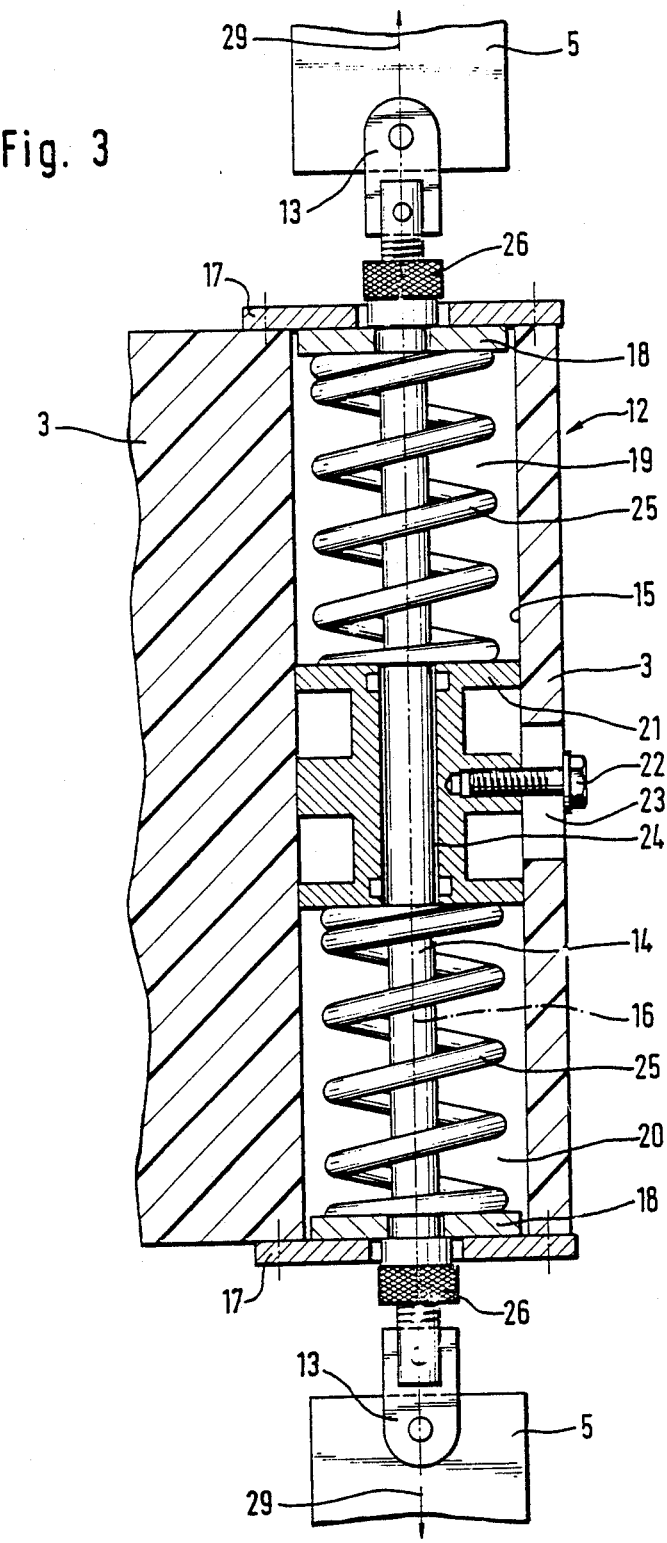
FIG. 3 is an enlarged sectional view taken along the line 3—3 of FIG. 1 showing the measuring force generator unit of FIG. 1.

As is clearly shown in FIG. 3, the measuring force generator unit 12 is arranged in or on the measurement carriage 3 as a hollow cylinder or housing 15. The unit 12 includes a ram 14, lying on the longitudinal cylinder axis 16 of the housing 15. The ram 14 has opposite ends which protrude from the cylinder housing 15 and are firmly joined to respective mounting links 13 which are connected to a steel belt or endless cable 5. The cylinder housing 15 is closed at either end face by a base 17, on each of which a ring 18 is seated inside the housing. The cylinder housing 15 of the measuring force generator unit 12 is divided into an upper housing chamber 19 and a lower housing chamber 20. The division is accomplished by a ring piece 21, placed approximately in the middle, creating two housing chambers 19 and 20 of roughly equal length. The ring piece 21 is secured by a clamping screw 22, which is screwed into the ring piece 21 through an opening 23 in the length of the cylinder housing 15 and allows a displacement of the ring piece 21 in the axial direction of the ram 14 inside this opening.

Between the ring piece 21 and the ram is placed a viscose dampener 24. Springs 25 are provided in both the upper housing chamber 19 and the lower housing chamber 20, braced with their ends against the respective rings 28 and the ring piece 21. Outside the bases of the cylinder housing 15, in addition, locking nuts 26 are screwed onto the ram 14 and provide a positive stop for the ram at its respective ends.

Figure 4:
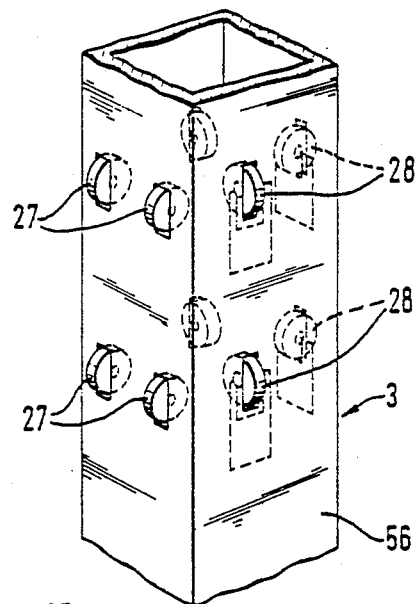
FIG. 4 is a perspective view of an embodiment for the mounting of the carriage of FIG. 1.

The measurement carriage 3 in this embodiment is made from a carbon fiber material. As shown in FIG. 4, the mounting of the carriage 3 on the guide 2 is achieved by firmly installed bearing rollers 27 or, alternatively, spring loaded bearing rollers 28, whereby a robust and shop-ready guidance of the measurement carriage is achieved. The steel belt can be moved by the drive motor upwards or downwards, according to the arrow of motion 29. Through this motion, the ram 14 is carried along in that the ram 14 is carried along in the same direction, and with it moves the firmly attached measurement carriage with the measuring pin 4 rigidly installed. If, for example, the steel belt 5 is moved upwards, the entire measurement carriage 3 with the measuring force generator unit 12 will move along in the same direction until the measuring pin 4 comes into contact with a measurement site of a measurement object. This means that the lower spring 25 in the lower housing chamber 20 of the measuring force generator unit 12 is tensioned (compressed), whereas the upper spring 25 in the upper housing chamber 19 of the measuring force generator unit 12 remains at complete rest. This prestressing of the spring 25 corresponds to the measuring force exerted by the measuring pin 4 against a measurement site. The reverse situation occurs when the steel belt 5 is moved downward by the drive motor 10 and, again, the measuring pin 4 comes up against a measurement object. In this case, the upper spring 25 in the upper housing chamber 19 would be prestressed, whereas the lower spring 25 in the lower housing chamber 20 remains at rest.

A counterbalancing of the weight of the measurement carriage 3, furthermore, is possible by the ring piece 21, which is axially adjustable within the region of the lengthwise opening 23.

Figure 5:
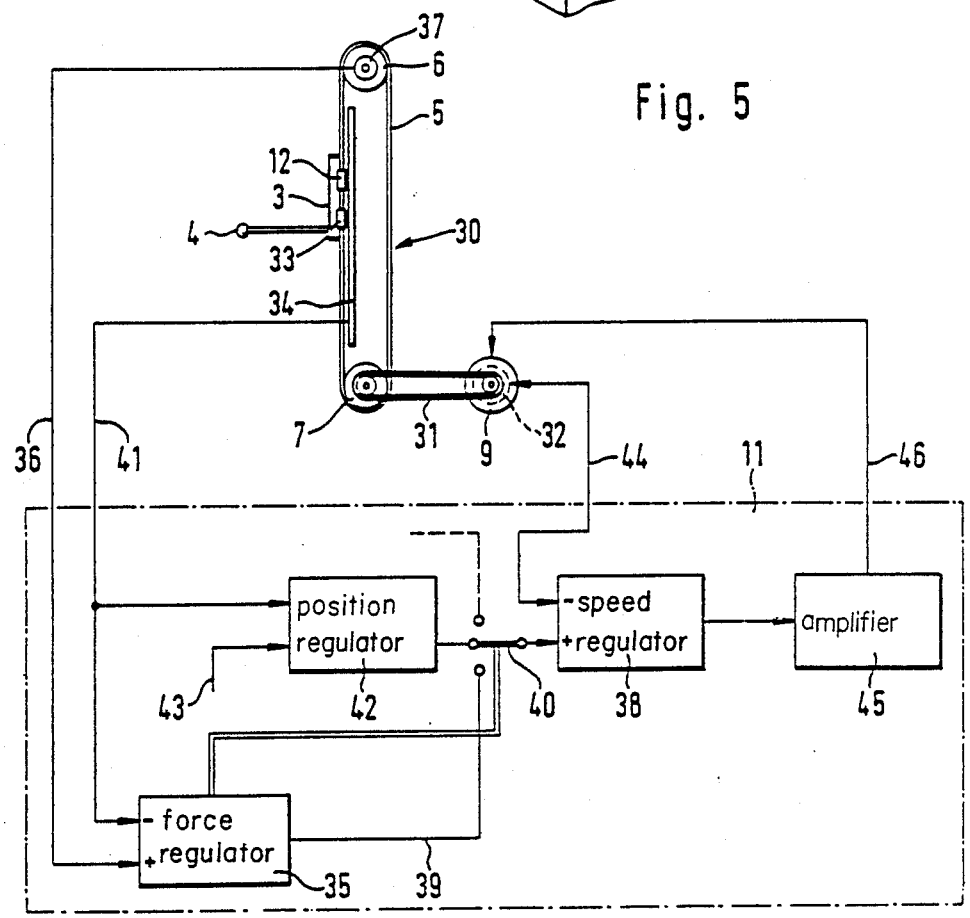
FIG. 5 is a schematic diagram of the height measuring device control unit.

FIG. 5 shows the height measuring device 30 with the electric drive motor 9 in drive linkage 31 with the lower deflection pulley 7. The gear motor, in addition, is equipped with a tachometer 32. On the measurement carriage 3, there is provided the measuring force generator unit 12 and a probe 33, interacting with an incremental measuring rod or calibrated scale 34. The upper deflection pulley 6 with shaft encoder 37 and the incremental measuring rod 34 are connected to a measuring force regulator 35 or 60 (FIG. 6) respectively, by the lines 36 and 41. The measuring force regulator 35 in the control unit 11, is formed as a digital circuit with digital-/analog output and can be implemented with modest hardware expense as a microprocessor. Thus the nominal value of a measuring force for the probing of the measurement object by the measuring pin 4 is set. For example, this may be a probing pressure of 20 mN. Whenever, now, the incremental shaft encoder 37 shows a difference from the incremental measuring rod 34, such as 10 mcm, this will correspond to a predetermined measuring force. This value is sent to a speed regulator 38, by means of which the measuring pin 4 is adjusted to the particular correct position at which the preset measuring force is attained. For this purpose, the measuring force regulator 35 or 60, respectively, is connected by the line 39 to a switch 40, which in turn is connected to the speed regulator 38. The line 41 connects the incremental measuring rod 34 to both the measuring force regulator 35 and a position regulator 42. A nominal position value 43 can be entered in the position regulator. The particular motor speed is picked off by a tachometer 32. This value road by the tachometer 32 is conveyed to the speed regulator 38 by the line 44. There is another connection between the position regulator 42, via the switch 40, and the speed regulator 38. From the speed regulator 38, a signal is sent across an amplifier 45 by means of another line 46 to the drive motor 9, by which the steel belt 5, and thereby, the measurement carriage with the measuring pin 4 are set in motion. The steel belt 5, in turn, exerts influence on the measuring force generator unit 12 to generate a preset measuring force.

The shaft encoder 37 on the upper deflection pulley 6 counts off in the positioning mode, synchronously with the incremental measuring system itself. When contact is made, the switch is tripped and the measuring force regulator 35 or 60 presets the nominal value for the speed regulator circuit.

The programmable measuring force, according to Hooke's law, corresponds to a path difference between the incremental path system and the shaft encoder 37. To achieve a hunt-free path difference, the output quantity (line 39) of the measuring force regulator 36 or 60 tends toward zero. The switch 40 is formed as a mode selector switch among the modes:

position regulation by means of the position regulator, movement with joystick, regulation of probing pressure.

Figure 6:
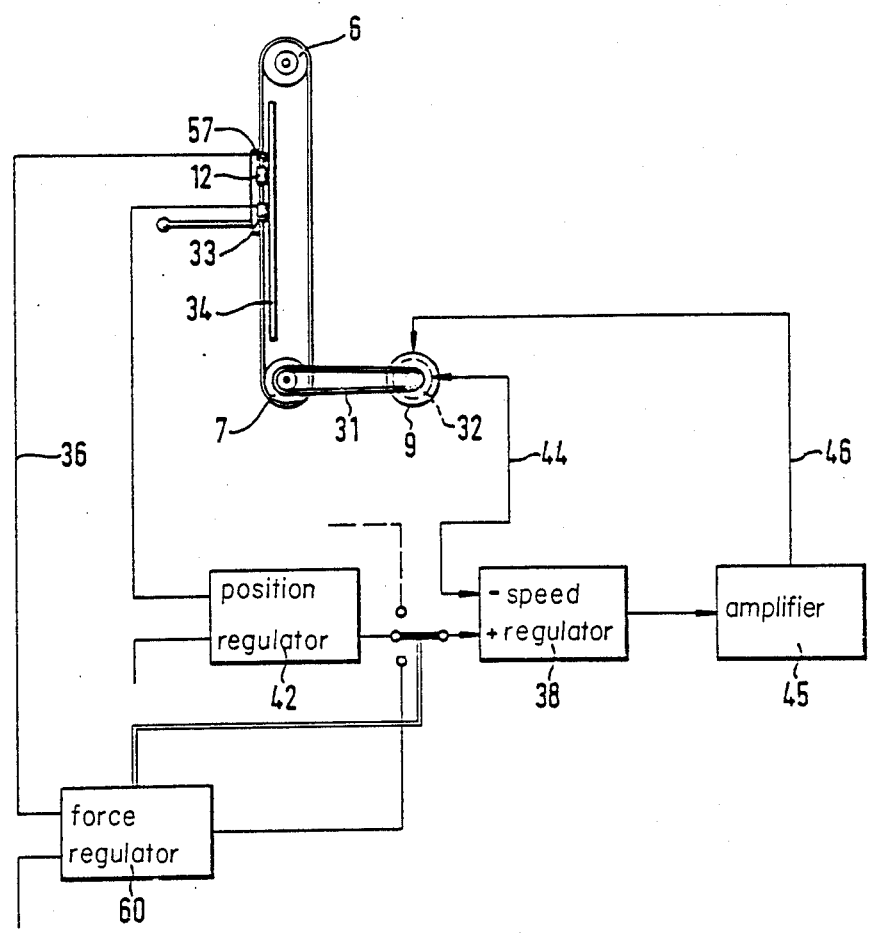
FIG. 6 is a schematic diagram of another embodiment of the height measuring device control.

As an alternative to this, FIG. 6 shows the measuring force regulator 60 in the implementation as a simple analog circuit, in which the functional components are employed in similar sense to FIG. 5. Here, a sensor is indicated by 57. The actual value of the force in FIG. 6 is indirectly determined by optical sensors.

In FIGS. 7 through 10, various sensor arrangements are shown.

FIGS. 7a and 7b show a segment of the ram 14 of the measuring force generator unit 12, which is provided with an annular groove 47.

Instead of the annular groove 47, of course, a different recess can be made on the ram 14. An optical sensor 48 is furnished with two light sources 49, facing which, at identical height, are two photocells 50. As the rod travels up or down in the direction of the arrow 29, the light beams from the light sources are received by the photocells 50. Displacement has the effect that at least one light source 49 is no longer detected by the opposite photocell 50.

The control unit 11 in each actuates the drive motor 9 so that the ram 14 is moved into the predetermined position in which the optical sensor is fully operational.

The two optical sensors 49 and 50 work by the light/-shadow principle. The increase in shadow of the two sensor pairs work in opposite directions, that is, when the ram 14 moves in one direction, one photocell 50 will be dimmed, while at the same time the other photocell will receive more illumination. The difference between the two sensor pairs is amplified and suitably evaluated.

Instead of the optical sensor as per FIG. 6, it is possible to select a configuration as per FIG. 8. Here, a vane 51 is fastened to the ram 14, having two recesses 52, serving to accommodate light sources 49. The procedure is, again, similar to the process in FIGS. 7a and 7b.

In FIGS. 9 and 10, so-called strain gage sensors 53 are used. These are located on plate springs 54, one end of which is secured to the ram 14, while the other end is fixed in an appliance 55.

While specific embodiments of the invention have been shown and described in detail to illustrate the application of the principles of the invention, it will be understood that the invention may be embodied otherwise without departing from such principles.

What is claimed is:

1. A height measuring device in which a measuring pin is moved against an article with a predetermined measuring pressure, comprising an upright support, an endless belt moving system on said support including first and second vertically spaced guide rollers mounted at vertically spaced locations on said support, a measurement carriage having a measuring pin thereon extending substantially horizontally and which is movable with said endless belt moving system to a measuring site which may be moved upwardly and downwardly to bear against the article to be measured, said carriage having a hollow portion extending vertically therethrough with a base member closing each end of said hollow portion, said base members each having an opening therethrough, a ramrod extending through said hollow portion and each opening, said endless belt moving system including a belt guided over said rollers and having respective ends connected to respective ends of said ramrod, a ring piece divider in said hollow portion dividing said hollow portion into upper and lower chambers, a coil spring around said ramrod in each of said upper and lower chambers having opposite ends braced against said ring piece divider and outer oppositely extending ends braced against a corresponding one of said base members, a drive motor connected to at least one of said rollers to drive said belt with said rollers, and control means connected to said motor and having sensing means for sensing a force acting on said ramrod and acting on said measuring pin, said control means driving said motor to effect a desired measuring pressure between the measuring pin and the article to be measured.

2. A height measuring device according to claim 1, wherein said coil springs and said ramrod acting on said belt comprise a measuring force generating unit between said measuring carriage and said belt, said control of said drive motor producing a selectable constantly regulated probing pressure between said measuring pin and a measuring site.

3. A height measuring device according to claim 2, wherein said ring piece divider is held in said hollow portion of said carriage by a screw connection such that it allows a limited, axially displaced adjustability.

4. A height measuring device according to claim 2, wherein said ramrod includes opposite ends which extend out of the hollow portion and carry threaded portions and a locking nut connected to said threaded portions to provide a positive stop.

5. A height measuring device according to claim 4, wherein said sensing means comprises two optical sensors provided in a differential arrangement which detect the axial movement of said ramrod, said ramrod having an annular groove in the central area thereof against which said sensors are directed.

6. A height measuring device according to claim 4, wherein said sensing means included two optical sensors arranged in a differential arrangement which detect axial movement of said ramrod and including a vane fastened to said ramrod at which said optical sensors are located.

7. A height measuring device according to claim 4, wherein said sensing means comprises a strain gage sensor which detects the axial movement of said ramrod, said strain gage sensor being arranged on plate springs which are firmly constrained at one end and firmly connected to said ramrod at their opposite ends.

8. A height measuring device according to claim 1, wherein said control means includes a measuring force regulator and a position regulator for the measuring pin, said control means also including a coordinated speed regulator and an amplifier, said coordinated speed regulator acting to vary the speed of the motor via said amplifier in accordance with the position of the measuring pin.

9. A height measuring device according to claim 8, wherein said measuring force regulator is connected to said sensing means for direct perception of the movement of said ramrod.

10. A height measuring device according to claim 8, wherein said measuring force regulator ascertains the movement of said ramrod caused by said belt using said sensing means comprising a shaft encoder which measures this relative to a linear incremental measurement system.

11. A height measuring device according to claim 1, wherein said measurement carriage moves along said support and is made of carbon fiber material.

12. A height measuring device according to claim 1, wherein said measuring carriage has a measuring force generator comprising said hollow portion, said ramrod extending through said hollow portion with said springs in the upper and lower chamber of said hollow portion on each side of said ring piece divider and including a guide along which said carriage is movable, said guide defining spring loaded rollers in walls thereof bearing against said carriage.

* * * * *